(12) United States Patent
Poulin et al.

(10) Patent No.: US 6,387,320 B1
(45) Date of Patent: May 14, 2002

(54) WATER TABLE WITH A SYSTEM FOR MODIFYING ITS INTERIOR VOLUME AND CLEANING ITS WATER

(76) Inventors: Eric Poulin, 15575 12$^{th}$ Avenue, St-Georges QC (CA), G5Y 7W2; Jacques Poulin, 6125 128 ≡ Street, St-Georges Quebec (CA), G5Y 5B9

( * ) Notice: Subject to any disclaimer, the term of this patent is extended or adjusted under 35 U.S.C. 154(b) by 0 days.

(21) Appl. No.: 09/771,598

(22) Filed: Jan. 30, 2001

(51) Int. Cl.$^7$ ............................................... B23K 7/08
(52) U.S. Cl. ............................................... 266/49; 266/48
(58) Field of Search ................................. 266/48, 49

(56) References Cited

U.S. PATENT DOCUMENTS

| | | | |
|---|---|---|---|
| 2,792,846 A | * 5/1957 | Grieshaber et al. | .... 137/543.23 |
| 3,792,846 A | 2/1974 | Geffert | |
| 3,969,122 A | 7/1976 | Miller et al. | |
| 4,097,713 A | * 6/1978 | Dunshee | ........................ 266/65 |
| 4,162,060 A | 7/1979 | Anderson et al. | |
| 4,453,702 A | 6/1984 | Anderson et al. | |
| 4,776,571 A | * 10/1988 | Lougee | ........................ 266/49 |
| 4,887,797 A | 12/1989 | Karow | |
| 4,986,515 A | * 1/1991 | Anderson | ..................... 266/49 |
| 5,013,884 A | * 5/1991 | Hahn | ........................... 266/49 |
| 5,167,903 A | * 12/1992 | Anderson | ..................... 266/49 |

* cited by examiner

Primary Examiner—Scott Kastler
(74) Attorney, Agent, or Firm—Swabey Ogilvy Renault; Guy J. Houle

(57) ABSTRACT

A water table used for cutting metal is comprised of an array of slat bars, a floor part below the array of slat bars, a movable platform further below the floor part. The movable platform, by the use of height changing means, will move in order to change the volume available inside the water table which results in the actual lowering or raising of the level of water inside of the water table.

21 Claims, 3 Drawing Sheets

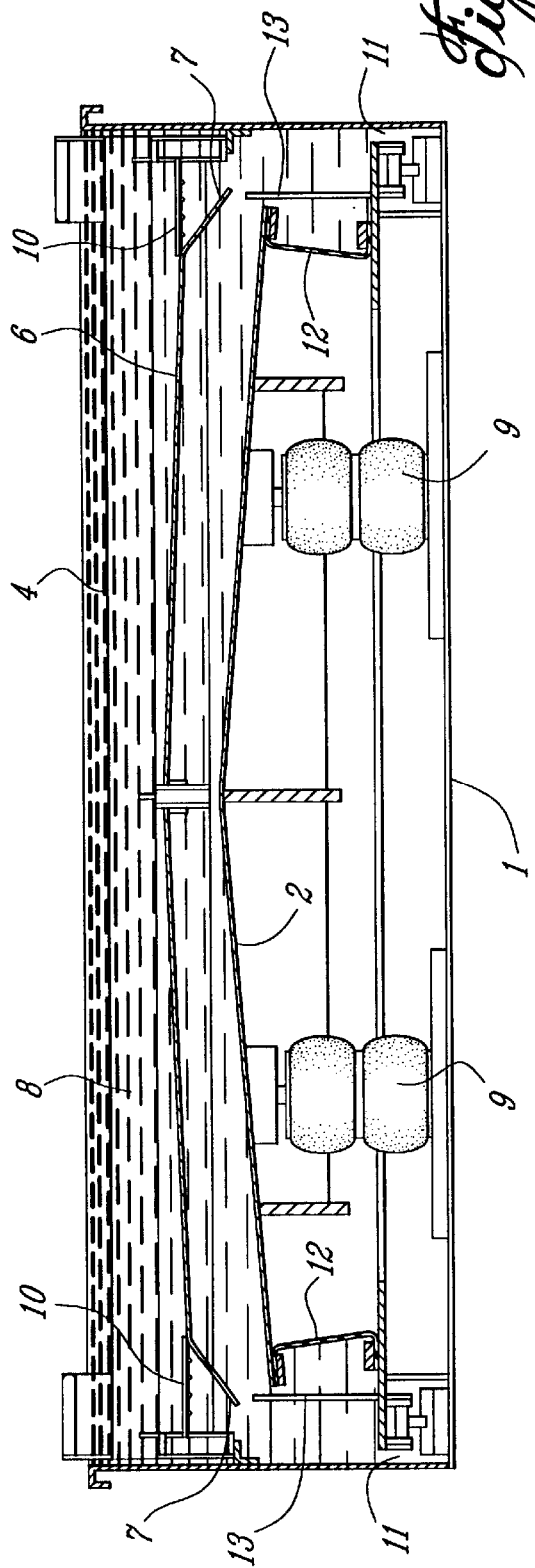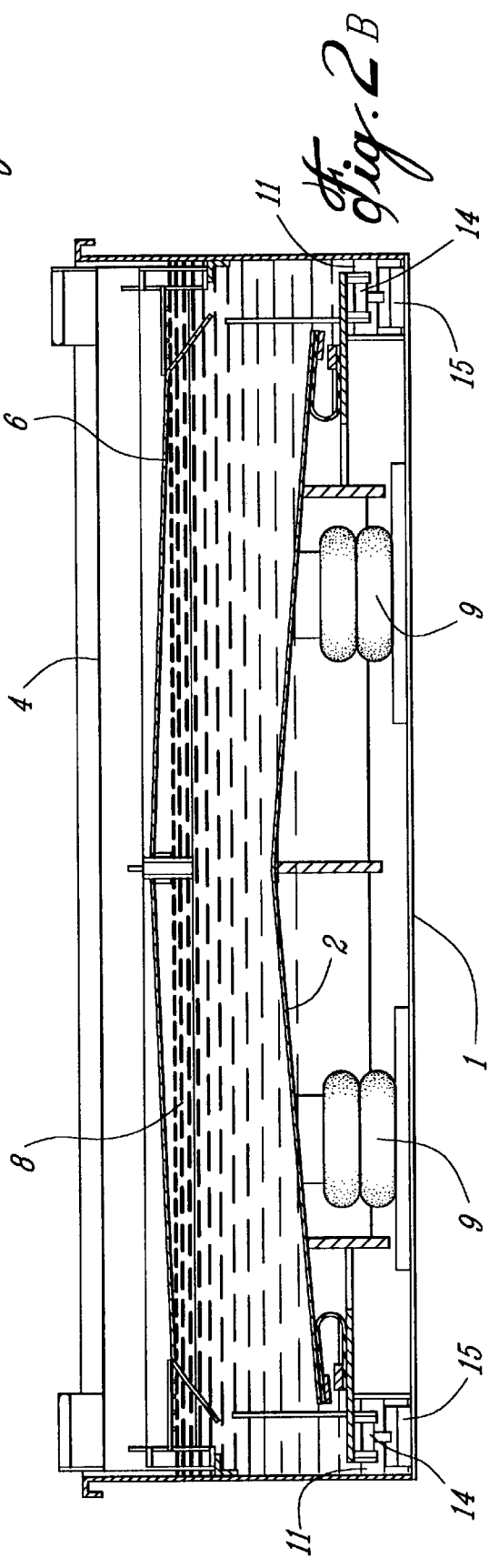

WATER TABLE WITH A SYSTEM FOR MODIFYING ITS INTERIOR VOLUME AND CLEANING ITS WATER

TECHNICAL FIELD

The invention is a water table such as those used for plasma cutting that can change the water level as well as provide an automated cleaning system for the water.

The invention relates generally to water tables used for cutting metal but more particularly to self-cleaning water tables comprised of means to raise and lower the water level.

BACKGROUND ART

Plasma cutting releases dangerous gas fumes and the metals being cut also release small airborne particles that, when mixed with the plasma gases, can foul the surrounding air. Moreover, plasma cutting is very noisy, very bright and very hot. For all these reasons, underwater cutting has been used for many years for that type of metal cutting. Although it has solved a number of problems, underwater cutting also brought about its own set of inconveniences. For example, the metal sheets can become slippery when left underwater, which can be hazardous for workers who have to handle them. For this and other reasons discussed in patent application 3,792,846 by Geffert, water tables having means to raise or lower water level have been developed and some of these patents, including the above cited, include means to clean the cutting residues which would have previously been released into the air. The preferred method of raising or lowering the water level consists of the use of compressed air to push water out of a small tank and into the larger water table containment. This method requires a smaller tank to hold surplus water and necessitates the use of compressors to push air into the smaller tank in order to evacuate water out of that tank and into the water table. The larger the size of the water table, the greater the needs for huge compressors, large air tanks and all the attendant costs involved in that extra hardware. Example of that method can be found in patent 4,162,060 by Anderson.

Furthermore, using air to move water creates a lot of turbulence which causes particles in the water to remain suspended longer. Polluted water tends to reduce the usable life of the consumable parts of the cutting torch. Methods currently in use, such as those described in patents 3,792, 846, 4,453,702 and 4,867,797 will either handle the cleaning of large debris very well but not small particles or vice versa but not both. Patent 4,162,060 for example doesn't handle the disposal of slag very well.

There are a number of other patents relating to water displacements and methods of cleaning the water but none include all of the novel features of this instant invention.

SUMMARY OF INVENTION

The purpose of this invention is to provide a practical and economical alternative to existing water tables used for cutting.

It is an object of this invention to provide a practical means of raising and lowering the water in the water table which reduces the agitation of the water so as to reduce the movement of suspended particles since no air or other gases are used directly upon the water in order to push it (as per patent 4,162,060 by Anderson).

It is another object of the invention to provide means to create a small bi-directional current in the water to move the suspended particles as well as the already deposited particles and small cutting residues (generally referred to as "slag") toward the edges of the water table.

It is yet another object of the invention to provide a means to keep the water as clean as possible to prolong the life of the consumable parts of the cutting torch as well as keeping the parts being cut, cleaner.

It is a further object of the invention to provide an efficient conveyor means to remove the slag that has accumulated around the bottom periphery of the water table.

To accomplish that, this invention is comprised of a movable platform that can be raised or lowered, thus physically reducing the interior volume of the water table. Having less volume, the water is displaced in a manner which elevates its level inside the water table. This method of raising and lowering of the water level in the water table results in minimal turbulence and does not overly agitate suspended particles thus keeping the water cleaner.

Furthermore, because of the slanted slope of the movable platform, raising it creates currents in the water which direct suspended particles, mostly found above the sloped floor part of the water table, toward the edges of the water table, there, they fall down onto a continuous loop conveyor that takes them out of the water table.

Other advantages will become evident upon reading the description.

BRIEF DESCRIPTION OF DRAWINGS

FIG. 2a is a side elevation of the water table showing the movable platform, raised.

FIG. 2b is a side elevation of the water table showing the movable platform, lowered.

DESCRIPTION OF PREFERRED EMBODIMENTS

Figure 1:
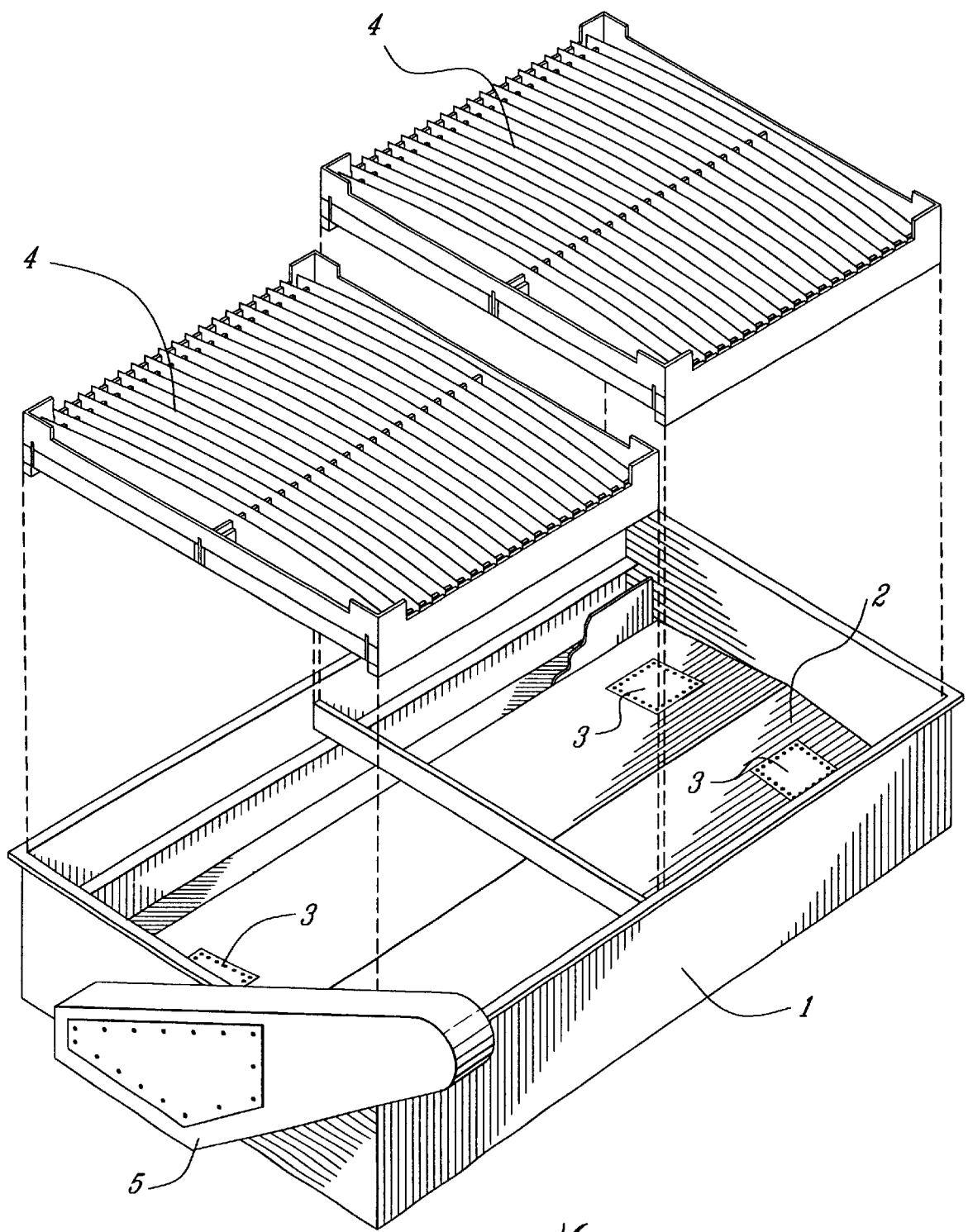
FIG. 1 is a perspective view of the water table showing the main components.

FIG. 1. A water table 1 contains a movable platform 2 with access panels 3, and least one array of slat bars 4 laying on top. Outside the said water table 1 is a conveyor belt elevator 5. By force of habit or for practical reasons, the cutting work is often performed at about the same place so cutting torches will wear the same area of the array of slat bars 4. This is why this invention provides for arrays of slat bars 4 that are detachably removable and can be turned around 180 degrees to present new areas to be exposed to cutting torches. Since more than one such removable array of slat bars 4 can make up a water table 1, arrays of slat bars 4 can switch places. Easy removal of the array of slat bars 4 also makes the cleaning of large debris possible by simply taking the said arrays of slat bars 4 off the water table 1, tipping them on their side so that the debris slide off or by passing a broom.

FIG. 2a. Below the array of slat bars 4 is a sloped floor 6 which has two inclines each having a common apex situated along a line running from one end to the other along the length of the said sloped floor 6. When the array of slat bars 4 is detachably removed for cleaning or maintenance, this sloped floor 6 as well as the adjoining deflector panel 7 and grilles 10 come out as one. When the movable platform 2 is in the elevated position, the level of water 8 is above the array of slat bars 4. When the movable platform 2 is lowered by height changing means 9, comprised of, but not limited to, the group consisting of hydraulic jacks, pneumatic jacks, leading screws and so on, the volume available inside the water table 1 will be increased which results in the actual lowering of the level of water 8 inside the water table 1 in relation to the arrays of slat bars 4. During this water displacement operation, the water 8 that is on top of the sloped floor 6 will be displaced and that displacement creates two currents running in opposite direction each starting from a point situated just above the apex of the sloped floor 6 and moving towards one edge for one current and the other edge for the other current. The currents thus created move suspended particles as well as the slag already lying on the sloped floor 6 toward the edges of the water table 1 until they fall through grilles 10, that filter out the bigger debris from the smaller ones, and down into a conveyor channel 11. To make sure that sharp debris don't puncture a skirt 12, deflector panels 7 and side boards 13 are set up around the periphery of the said skirt 12. The skirt 12, which helps keep the water 8 contained within the water table 1, is fixedly attached to the movable platform 2 as well as to the water table 1, and is made of a water impermeable and highly resilient compound which can endure repeated folding and unfolding as well as the weight and pressure applied to it by the water 8.

FIG. 2b. When the movable platform 2 is in the down position, the level of the water 8 is also down and the array of slat bars 4 is cleared of the water 8. In the process of raising these movable platform 2, the available volume inside the water table 1 is decreased which results in the level of the water 8 to rise (as in FIG. 2a) When the water table 1 is not in operation, a conveyor belt 14 which runs around the periphery of the said water table 1 is used. The conveyor belt 14 which carries all of the accumulated slag takes the slag outside the water table 1. The said conveyor belt 14 can consist of a flat carpet that receives the debris and particles (slag)or, more appropriately in this situation, paddles 15 which scrape the bottom of the conveyor channel 11 to take out the slag.

Figure 3:
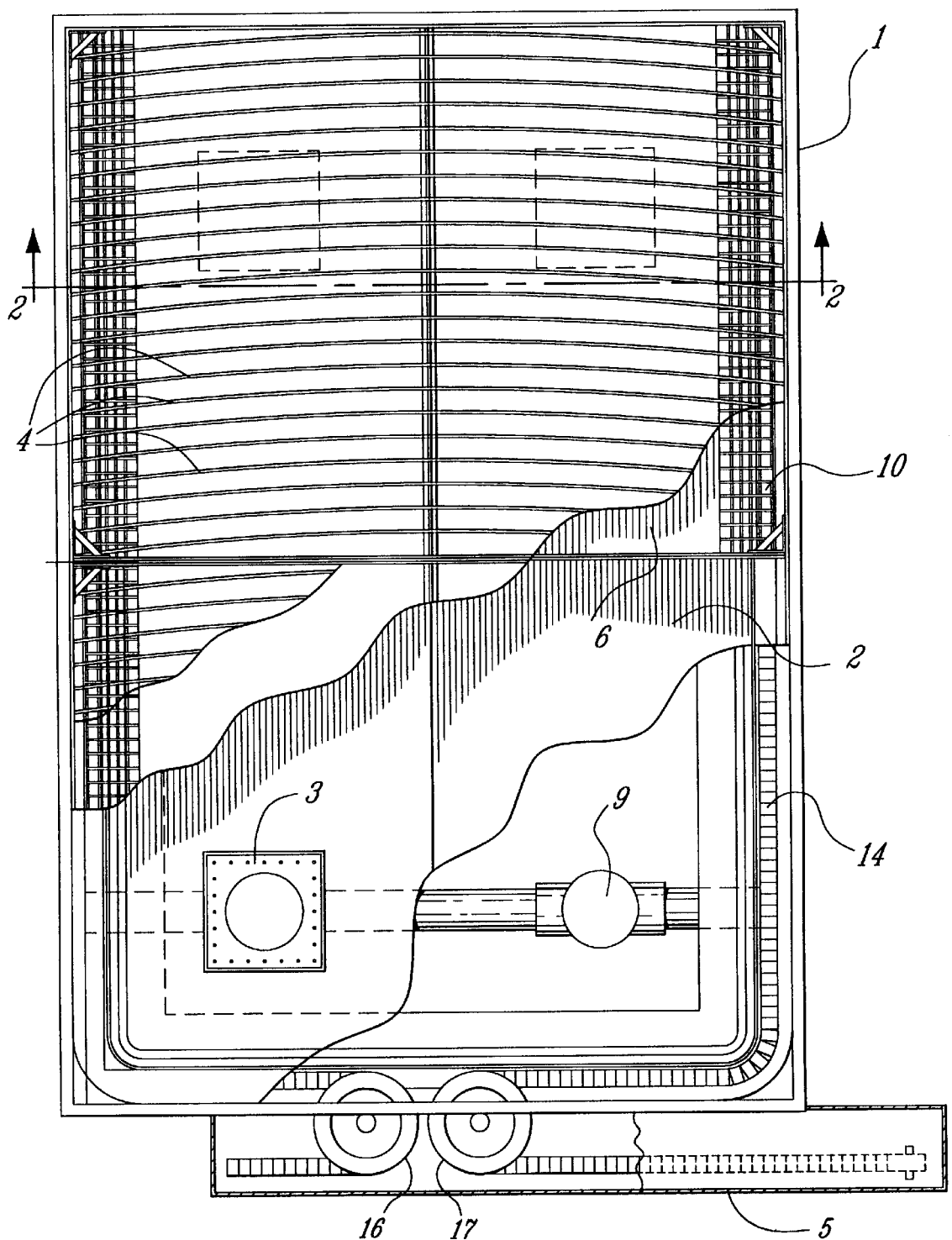
FIG. 3 is a top view of the water table.

FIG. 3. This top view shows the various layers which make up the water table 1. The topmost layer is occupied by one or more arrays of slat bars 4 below is the sloped floor 6. Below the said sloped floor 6 is the movable platform 2. It should be noted that a larger water table 1 could require two or more movable platforms 2 as well as two or more conveyor belts 14. Other previously identified components are the grilles 10, the height changing means 9, the access panels 3 that lead to the height changing means 9, the conveyor belt 14 and an entry point 16 and an exit point 17 to carry the particles and slag through the conveyor belt elevator 5.

Although it has been found that the preferred embodiment described above provides a practical, new and unobvious way of changing the interior volume of the water table 1 as well as providing means of cleaning the water table 1, it should be understood that the description above can also include other means such as balloons or bellows moving sideways or downward or any other way instead of up and down that could be used to produce similar results by using variations in the shapes of the components described herein. It should also be noted that a movable platform 2 situated above the water table 1 could move downward and into the water table 1 in order to change its interior volume.

What is claimed is:

1. A water table for cutting metal pieces, comprising:
    a container having a top open end and a liquid pool therein for collecting residue from cutting metal pieces;
    a support grid secured adjacent to said top open end of said container and adapted for receiving thereon metal pieces to be cut;
    an expanding member in said container, said expanding member being expandable so as to raise and lower a level of said liquid pool in said container to cover at least partially said support grid;
    filter means for filtering unwanted residue collected on a collecting surface; and
    said collecting surface having at least one inclined portion below said support grid, said inclined portion creating a liquid current thereon when the level of said liquid pool is lowered, so as to carry unwanted residue gathered from cutting metal pieces to said filter means.

2. The water table according to claim 1, wherein said filter means is positioned at a bottom edge of said inclined portion of said collecting surface.

3. The water table according to claim 2, wherein said filter means has at lease a screen portion.

4. The water table according to claim 3, wherein said filter means comprises a conveyor portion positioned below said bottom edge of said inclined portion for accumulating residue thereon and conveying the unwanted residue out of said container.

5. The water table according to claim 4, wherein said conveyor portion conveys said residue outwardly from said container, independently of the level of said liquid pool.

6. The water table according to claim 5, wherein said conveyor portion is disposed on an inner periphery of said container.

7. The water table according to claim 1, wherein said expandable member is a wall connected to a surface of said container by a watertight skirt member, said wall being displaceable for modifying the level of said liquid pool in said container.

8. The water table according to claim 7, wherein said surface of said container having said wall connected thereto by said watertight skirt is at a bottom area of said container, and said wall is displaceable vertically above said bottom area.

9. The water table according to claim 7, wherein said skirt consist of a resilient material adapted for sustaining contraction and retraction cycles.

10. The water table according to claim 7, wherein said wall is displaced by one of mechanical, electric, pneumatic and hydraulic actuators.

11. The water table according to claim 1, wherein said support grid is removable from said container.

12. The water table according to claim 1, wherein said collecting surface comprises a pair of said inclined portions having a common apex.

13. The water table according to claim 7, wherein said wall of said expandable member has at least one access panel for reaching an actuator of said expandable member.

14. The water table according to claim 1, wherein said support grid is defined by a plurality of spaced slat bars having openings therebetween for the passage of said residue.

15. A water table for cutting metal pieces, comprising:
    a container having a top open end and a liquid pool therein for collecting residue from cutting metal pieces;
    a support grid secured adjacent to said top open end of said container and adapted for receiving thereon metal pieces to be cut; and
    an ambient pressure compartment in said container, said ambient pressure compartment defined by a displaceable wall connected to a surface of said container by a flexible watertight skirt, said displaceable wall being displaceable for expanding said ambient pressure compartment so as to raise and lower a level of said liquid pool in said container to cover at least partially said support grid.

16. The water table according to claim 15, wherein said displaceable wall is displaced by at least one of pneumatic, hydraulic, electric and mechanical actuators.

17. The water table according to claims 15, wherein said surface of said container having said displaceable wall connected thereto by said flexible watertight skirt is at a bottom of said container, and said displaceable wall is displaceable vertically above said bottom.

18. The water table according to claim 15, wherein said support grid is removable from said container.

19. The water table according to claim 15, wherein said wall has at least one access panel for reaching an actuator of said ambient pressure compartment.

20. The water table according to claim 15, wherein said support grid is defined by a plurality of spaced slat bars having openings therebetween for the passage of said residue.

21. The water table according to claim 15, wherein said watertight skirt consist of a resilient material adapted for sustaining contraction and retraction cycles.

* * * * *